(12) United States Patent
Yi et al.

(10) Patent No.: US 8,098,177 B2
(45) Date of Patent: Jan. 17, 2012

(54) MAPPING ALPHABETIC CHARACTERS TO A NUMERIC KEYPAD

(75) Inventors: Byung K. Yi, San Diego, CA (US); Jungwon Min, San Diego, CA (US)

(73) Assignee: LG Electronics Inc., Seoul (KR)

( * ) Notice: Subject to any disclaimer, the term of this patent is extended or adjusted under 35 U.S.C. 154(b) by 831 days.

(21) Appl. No.: 12/189,072

(22) Filed: Aug. 8, 2008

(65) Prior Publication Data

US 2009/0051572 A1    Feb. 26, 2009

Related U.S. Application Data

(60) Provisional application No. 60/957,804, filed on Aug. 24, 2007.

(51) Int. Cl.
    *H03K 17/94*    (2006.01)
(52) U.S. Cl. ......................................................... 341/23
(58) Field of Classification Search ...................... 341/23
    See application file for complete search history.

(56) References Cited

U.S. PATENT DOCUMENTS

| | | | |
|---|---|---|---|
| 6,643,371 B2 * | 11/2003 | Mager | 379/355.07 |
| 6,765,556 B2 | 7/2004 | Kandogan et al. | |
| 2007/0279256 A1 * | 12/2007 | Salman et al. | 341/23 |
| 2008/0136682 A1 * | 6/2008 | Kandogan et al. | 341/22 |

FOREIGN PATENT DOCUMENTS

| | | |
|---|---|---|
| KR | 1020010025429 | 4/2001 |
| KR | 1020030000712 | 1/2003 |
| KR | 1020030043532 | 6/2003 |

* cited by examiner

*Primary Examiner* — Robert L. Deberadinis
(74) *Attorney, Agent, or Firm* — Lee, Hong, Degerman, Kang & Waimey (57) ABSTRACT

A keypad comprising a plurality of numerically labeled keys; wherein each key on a numeric keypad as mapped to letters of alphabet in a language, wherein a plurality of alphabetic letters are assigned to at least one key on the numeric keypad; wherein a first alphabetic letter is selected from among the plurality of alphabetic letters assigned to the key, in response to a first interaction with said key, such that the first alphabetic letter is the first most frequently used letter from among said plurality of letters assigned to the key in said language.

14 Claims, 7 Drawing Sheets

FIG. 1

| Letter | Number of Strokes | Letter | Number of Strokes | Letter | Number of Strokes |
|---|---|---|---|---|---|
| A | 1 | B | 2 | C | 3 |
| D | 1 | E | 2 | F | 3 |
| G | 1 | H | 2 | I | 3 |
| J | 1 | K | 2 | L | 3 |
| M | 1 | N | 2 | O | 3 |
| P | 1 | Q | 2 | R | 3 |
| S | 4 | T | 1 | U | 2 |
| V | 3 | W | 1 | X | 2 |
| Y | 3 | Z | 4 | | |

FIG. 2

| A | 8.17% | B | 1.49% | C | 2.78% |
|---|---|---|---|---|---|
| D | 4.25% | E | 12.70% | F | 2.23% |
| G | 2.02% | H | 6.09% | I | 6.97% |
| J | 0.15% | K | 0.77% | L | 4.03% |
| M | 2.41% | N | 6.75% | O | 7.51% |
| P | 1.93% | Q | 0.10% | R | 5.99% |
| S | 6.33% | T | 9.06% | U | 2.76% |
| V | 0.98% | W | 2.36% | X | 0.15% |
| Y | 1.97% | Z | 0.07% | | |

FIG. 3

| Letter | Number of Strokes | Letter | Number of Strokes | Letter | Number of Strokes |
|---|---|---|---|---|---|
| A | 1 | B | 3 | C | 2 |
| D | 2 | E | 1 | F | 3 |
| G | 3 | H | 2 | I | 1 |
| J | 3 | K | 2 | L | 1 |
| M | 3 | N | 2 | O | 1 |
| P | 3 | Q | 4 | R | 2 |
| S | 1 | T | 1 | U | 2 |
| V | 3 | W | 1 | X | 3 |
| Y | 2 | Z | 4 | | |

FIG. 4

| 1 @ | 2 acb | 3 edf |
|---|---|---|
| 4 ihg | 5 lkj | 6 onm |
| 7 srpq | 8 tuv | 9 wyxz |
| * | 0 | # |

FIG. 5

| 1 @ | 2 a<sub>b</sub>c | 3 de<sub>f</sub> |
|---|---|---|
| 4 <sub>gh</sub>i | 5 <sub>j</sub>kl | 6 <sub>m</sub>no |
| 7 <sub>pq</sub>rs | 8 tu<sub>v</sub> | 9 wxy<sub>z</sub> |
| * | 0 | # |

FIG. 6A

| 1 @ | 2 abc | 3 def |
|---|---|---|
| 4 ghi | 5 jkl | 6 mno |
| 7 pqrs | 8 tuv | 9 wxyz |
| * | 0 | # |

FIG. 6B

| 1 @ | 2 a b c | 3 d e f |
|---|---|---|
| 4 g h i | 5 j k l | 6 m n o |
| 7 p q r s | 8 t u v | 9 w x y z |
| * | 0 | # |

FIG. 6C

MAPPING ALPHABETIC CHARACTERS TO
A NUMERIC KEYPAD

CROSS-REFERENCED TO RELATED
APPLICATIONS

This application claims priority to and the benefit of U.S. Provisional Application No. 60/957,804 filed on Aug. 24, 2007, which is hereby incorporated by reference.

TECHNICAL FIELD

The present disclosure relates generally to numeric keypads and more particularly to mapping alphabetic letters in a certain language to a numeric keypad used on a telephonic device, for example.

BACKGROUND

Numeric keypads on mobile telephones are generally used for dialing a phone number. With the proliferation of wireless coverage and data communication services for mobile phones, many users can now communicate by way of sending text messages (i.e., texting).

Figure 1:
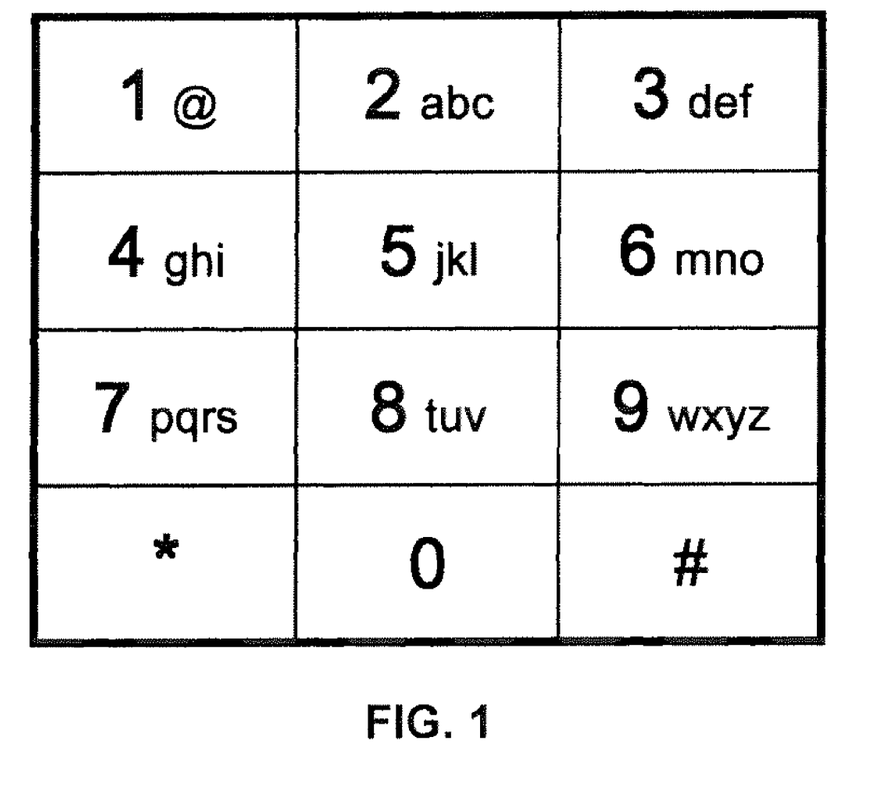
FIG. 1 illustrates a conventional numeric keypad used on a telephonic device.

Referring to FIG. 1, a standard numeric keypad has at least 10 numeric keys, such that there is a one-to-one relationship between each key on the numeric keypad and a digit in the range from 0 to 9. To allow a person to send a text message, the letters of alphabet are displayed on each key. There is no one-to-one assignment, however, between the letters of the alphabet and the numeric keys on a numeric keypad, because the number of alphabet letters in a language is more than 10. Thus, more than one letter of the alphabet has to be assigned to each key in order to enable a full alphabetic keypad.

Figure 2:
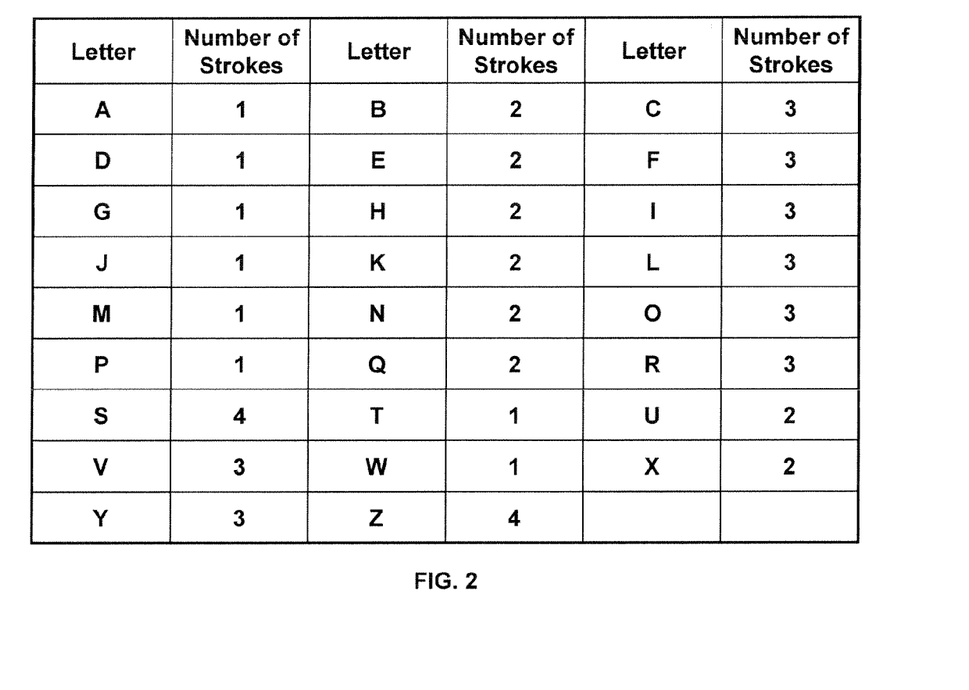
FIG. 2 is a table showing the number of keystrokes required to select a letter in the English alphabet, if the numeric keypad of FIG. 1 is used.

The problem associated with the design of an alphabetic keyboard on the 10 keys of a numeric keypad is that editing a text message, in most cases, requires a person to strike a key on the numeric keypad more than once in order to select a single alphabetic letter. Referring to FIGS. 1 and 2, for example, where alphabet letters "a", "b", and "c" are assigned to a numeric key for the number 2, a person may have to press the number 2 key three times just to enter a single letter "c".

FIG. 2 illustrates the number of key strokes associated with the letters of the English alphabet according to a standard mapping to a numeric keypad. As shown, the number of strokes for most letters is larger than one, requiring a user to interact excessively with the keypad in order to input a text message. The above-noted problem further leads to user frustration and errors. Methods and systems are needed than can overcome said problems.

SUMMARY

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a keypad mapping method comprises mapping keys on a numeric keypad to letters of alphabet in a language, wherein a plurality of alphabetic letters are assigned to at least one key on the numeric keypad; wherein a first alphabetic letter is selected from among the plurality of alphabetic letters assigned to the key, in response to a first interaction with said key, such that the first alphabetic letter is the first most frequently used letter from among said plurality of letters assigned to the key in said language; and wherein a second alphabetic letter is selected from among the plurality of alphabetic letters assigned to the key, in response to a second interaction with said key, such that the second alphabetic letter is the second most frequently used letter from among said plurality of letters assigned to the key in said language.

The plurality of alphabetic letters assigned to the key are displayed on a surface of the key in an order associated with frequency of use of each of said plurality of alphabetic letters in said language. In one embodiment, the plurality of alphabetic letters is displayed on the surface of the key in a descending order with respect to highest frequency of use. In some embodiments, the plurality of alphabetic letters assigned to the key are displayed on a surface of the key in a stylized manner reflecting frequency of use of each of said plurality of alphabetic letters in said language, such that more frequently used letters are styled in a more ubiquitous manner in comparison to less frequently used letters.

For example, a color coding scheme may be used to distinguish more frequently used characters from less frequently used letters. The most frequently used letter may be displayed in a first color, and a less frequently used letter is displayed in a second color different from the first color. In some embodiments, a font visualization scheme is used to distinguish more frequently used characters from less frequently used letters. The most frequently used scheme is displayed in a first font, and a less frequently used scheme is displayed in a second font different from the first font. In one implementation, the most frequently used letter is displayed in a first size, and a less frequently used letter is displayed in a second size different from the first size. The first size may be larger than the second size.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

The present invention is directed to methods and systems for mapping alphabetic characters or letters in a certain language to keys on a numeric keypad.

In accordance with one embodiment, keys on a numeric keypad may be mapped to letters of alphabet in a language such that a plurality of alphabetic letters are assigned to at least one key on the numeric keypad, where a first alphabetic letter may be selected from among the plurality of alphabetic letters assigned to the key, in response to a first interaction with said key, and a second alphabetic letter may be selected from among the plurality of alphabetic letters assigned to the key, in response to a second interaction with said key.

Desirably the first alphabetic letter is the first most frequently used letter from among said plurality of letters assigned to the key in said language, and the second alphabetic letter is the second most frequently used letter from among said plurality of letters assigned to the key in said language. The plurality of alphabetic letters assigned to the key may be displayed on a surface of the key in an order associated with frequency of use of each of said plurality of alphabetic letters in said language. For example, the plurality of alphabetic letters may be displayed on the surface of the key in a descending order with respect to highest frequency of use.

Figure 3:
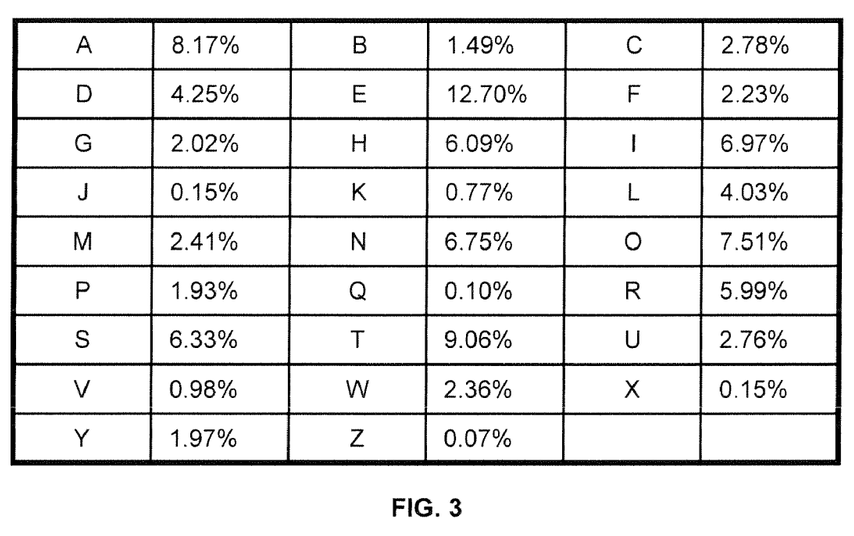
FIG. 3 illustrates the frequency of use of various alphabetic letters in the English language, in accordance with one embodiment.
Figure 4:
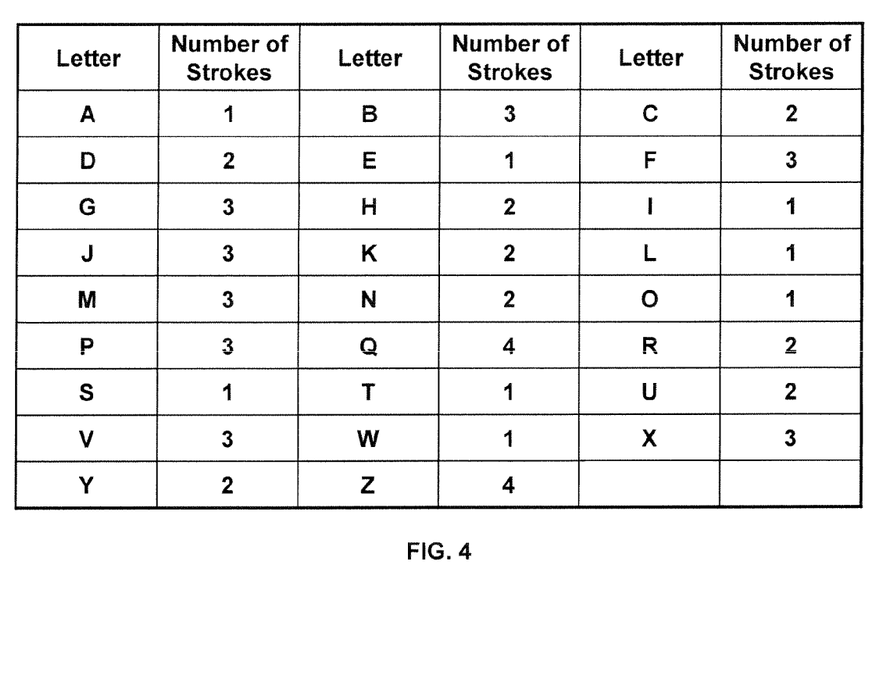
FIG. 4 is a table mapping the number of keystrokes to a letter in the English alphabet, where the numeric keypad of FIG. 5 or 6A-C is used, in accordance with one embodiment.
Figure 5:
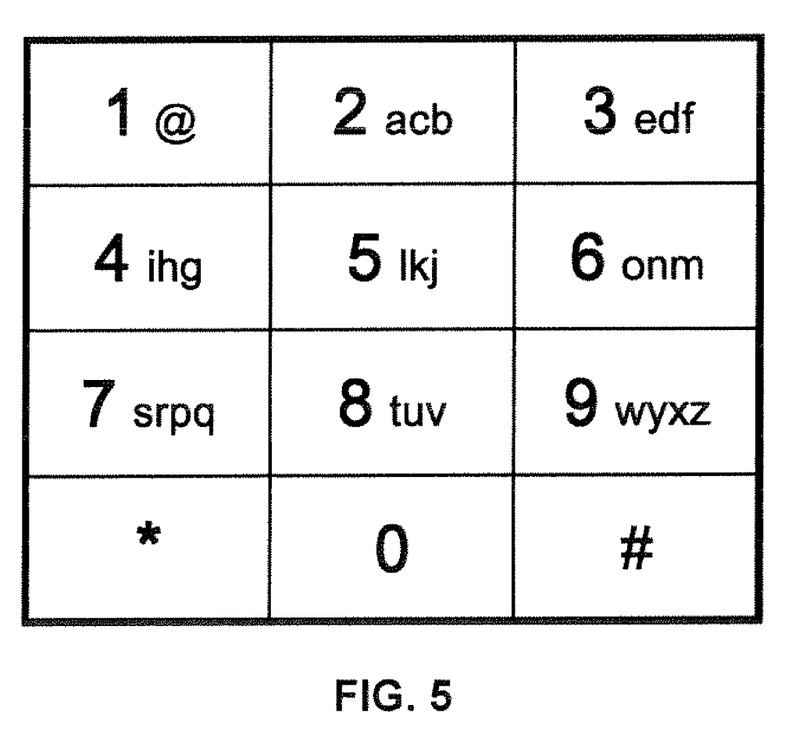
FIGS. 5 and 6A-C illustrate exemplary embodiments of a numeric keypad with multiple alphabetic letters mapped to individual numeric keys, in accordance with one embodiment.

In the following, one or more embodiments are disclosed as applicable to the letters of alphabet in the English language. It is noteworthy however that such embodiments are provided by way of example, and therefore the concepts and implementations disclosed herein may be applied to letters of alphabet used in any other language. Referring to FIGS. 3-5, for example, the frequency of use of various alphabetic letters in the English language, in accordance with one embodiment, are taken into account to help reduce the overall number of keystrokes on a numeric keypad. The level (i.e., frequency, percentage or probability) of use of various letters of the alphabet in a particular language can be determined according to linguistic studies.

In the English language, for example, the letter A is used about 8.17% of the words, letter B is used in about 1.49% of the words, and so on (see FIG. 3). Thus, the probability of occurrence of the letter A may be considered to be higher than that of letter B. Accordingly, if the mapping of the alphabet letters to the number keys is based on the level of usage of the letters, then the probability of the user striking a key more than once to select (i.e., input) a letter in a word is minimized. In other words, reordering the mapping of the alphabetic letters based on a mapping scheme that takes into account the probability of appearance of an alphabetic letter in a word may reduce the average number of strokes by a user interacting with a numeric keypad for the purpose of text entry.

Thus, according to one aspect of the invention, the letters having a lower probability of use or occurrence (e.g., less frequently used letters) are arranged on the numeric keypad in association with a higher number of key strokes. And, conversely, letters with a higher probability of use or occurrence (e.g., more frequently used letters) are arranged on the numeric keypad in association with a lower number of key strokes. In one embodiment to minimize or eliminate the need for redesigning the hardware or software elements on a device using a numeric keypad, the arrangement is such that the mapping of the letters to a key remains the same as a traditional numeric keypad, with the exception of the order of assignment of the letters to the sequence of strokes.

For example, referring to FIGS. 1 and 2, in a standard numeric keypad, the letters, "p", "q", "r", and "s", are mapped to the number key "7" such that selecting the letter "s" requires four strokes of the number key "7", while selecting the letter "p" requires one stroke (see FIG. 2). Now referring to FIG. 3, in one embodiment, while the same letters "p", "q", "r", and "s" are assigned to the same number key (e.g., key 7) the order in which the letters are selected based on a sequence of key strokes may be changed, so that a more probable (i.e., more frequently used) letter is selected earlier in response to a user striking the respective numeric key.

For example, "s" is a more frequently used letter in the English language with the statistical use frequency of 6.33% in comparison with either "p" with 1.93% or "q" with 0.10% statistical use frequency. Therefore, to take advantage of the above-noted usage frequencies, in one embodiment, the letter of alphabet with a higher use frequency (e.g., "s") is mapped to a position on an assigned numeric key which is more advanced (i.e., requires a smaller number of key strokes) than the letters of alphabet (e.g., "p", "q" or "r") that are assigned to the same key but which have a lower use frequency.

In other words, a traditional keypad without considering the use frequency of letters on average tends to increase the number of key strokes needed to select a letter of alphabet. Advantageously, the letters as mapped in a conventional keypad may be reordered based on the use frequencies of each letter as assigned to the same number key to reduce the number of key strokes on average. Thus, as shown in FIGS. 5 and 6A-6C, the most frequently used alphabet letter assigned to a number key may be positioned in advance of the other three or four letters assigned to the same key, so that it can be selected by a single stroke. The less frequently used letters assigned to the number key are placed in less advanced positions in the order of their use frequency, so that selecting such letters will require 2, 3 or 4 strokes respectively.

Statistical analysis proves that the above-noted novel mapping scheme will help reduce the total average number of strokes on a numeric keypad used for text entry. For example, in a numeric keypad with standard mapping for the English alphabet, the average number of strokes per number key including only alphabets (8 keys in total) is about 2.15. Using the above-noted novel mapping approach, however, the average number of strokes per key is about 1.55, amounting to 28.07% reduction in the total number of strikes. Similar results are expected to hold true if the above-noted scheme is applied to mappings for any other language.

In some embodiments, the plurality of alphabetic letters assigned to the key are displayed on a surface of the key in a stylized manner reflecting frequency of use of each of said plurality of alphabetic letters in said language, such that more frequently used letters are styled in a more ubiquitous manner in comparison to less frequently used letters. For example, a color coding scheme may be used to distinguish more frequently used characters from less frequently used letters. The most frequently used letter may be displayed in a first color, and a less frequently used letter is displayed in a second color different from the first color.

Figure 6A:
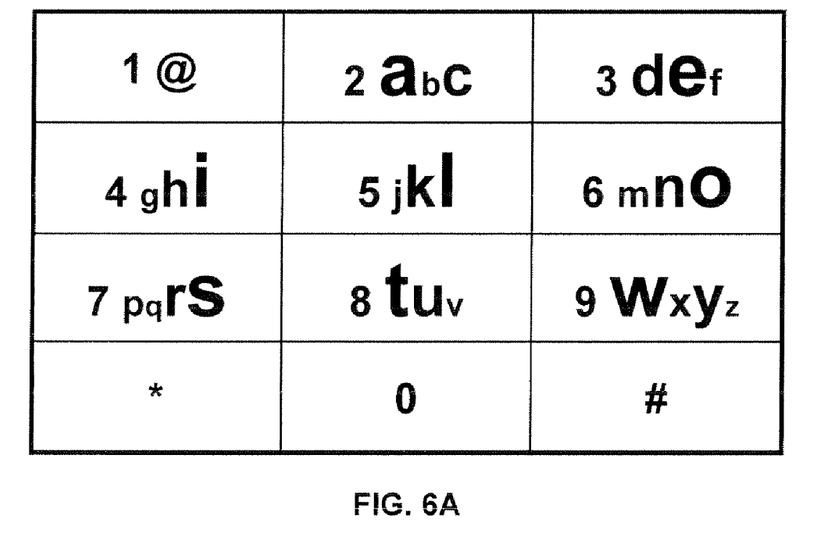
Figure 6B:
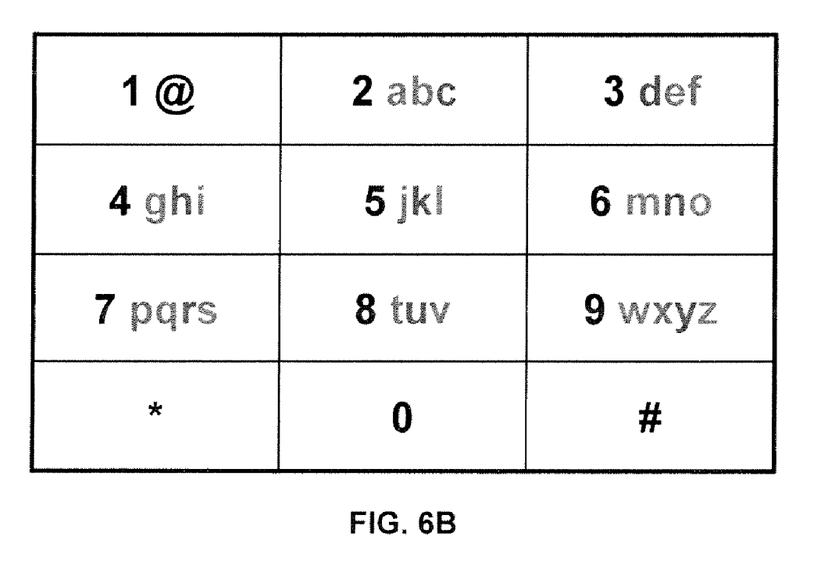
Figure 6C:
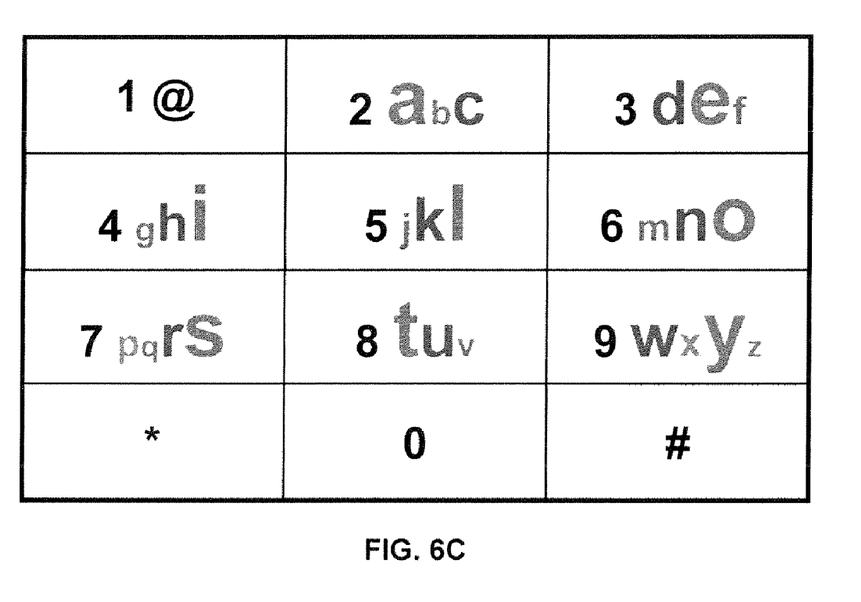

FIG. 5 illustrates a simple exemplary embodiment for the manner in which a numeric keypad may be labeled, according to the novel mapping scheme disclosed herein, to show the mapping arrangement (i.e., reordering) for selecting a letter of alphabet based on a sequence of key strikes. FIGS. 6A-6C provide alternative exemplary embodiments. As shown, the alphabet letters can be can be distinguished by different styles, colors, fonts or sizes (with or without reordering), or any combination of the above.

In some embodiments, a font visualization scheme may be used to distinguish more frequently used characters from less frequently used letters, such that the most frequently used scheme is displayed in a first font, and a less frequently used scheme is displayed in a second font different from the first font. In one implementation, the most frequently used letter is displayed in a first size, and a less frequently used letter is displayed in a second size different from the first size. The first size may be larger than the second size, for example. It is noteworthy that other distinctive look and feel arrangement is also possible. Therefore, the scope of the invention should not be construed as limited to the particular embodiments disclosed herein.

As noted above, advantageously, the above-noted remapping does not require substantive changes in system hardware or software of a telephonic device, since it changes the mapping order of alphabet locally with respect to a number key, such that the same letters remain assigned to the same key as in a traditional keypad, with the exception of a change in the order in which the letters are selected in response to the sequence of strokes. As such, the implementation of the novel scheme is not expensive as it does not require extensive redesign in the manufacturing steps.

Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections of buried interconnections).

In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method of mapping a keypad, the method comprising:
    mapping at least one key on a numeric keypad to alphabetic letters of a language, wherein a plurality of the alphabetic letters are assigned to each of the at least one key on the numeric keypad;
    receiving a first interaction with one key of the at least one key;
    selecting a first alphabetic letter from among the plurality of alphabetic letters assigned to the one key of the at least one key, in response to the first interaction with the one key, such that the first alphabetic letter is a first most frequently used letter from among said plurality of alphabetic letters assigned to the one key;
    receiving a second interaction with the one key of the at least one key; and
    selecting a second alphabetic letter from among the plurality of alphabetic letters assigned to the one key of the at least one key, in response to the second interaction with the one key, such that the second alphabetic letter is a second most frequently used letter from among said plurality of letters assigned to the one key,
    wherein the plurality of alphabetic letters assigned to the one key of the at least one key are displayed on a surface of the one key in a stylized manner reflecting frequency of use of each of said plurality of alphabetic letters such that more frequently used letters are styled in a more ubiquitous manner in comparison to less frequently used letters, and
    wherein a color coding scheme or a font visualization scheme is used to distinguish the more frequently used letters from the less frequently used letters.

2. The method of claim 1, wherein the plurality of alphabetic letters assigned to the one key of the at least one key are displayed on a surface of the one key in an order associated with frequency of use of each of said plurality of alphabetic letters.

3. The method of claim 2, wherein the plurality of alphabetic letters are displayed on the surface of the one key of the at least one key in a descending order with respect to highest frequency of use.

4. The method of claim 1, wherein a most frequently used letter assigned to the one key of the at least one key is displayed in a first color, and a less frequently used letter assigned to the one key of the at least one key is displayed in a second color different from the first color.

5. The method of claim 1, wherein a most frequently used letter assigned to the one key of the at least one key is displayed in a first font, and a less frequently used letter assigned to the one key of the at least one key is displayed in a second font different from the first font.

6. The method of claim 1, wherein a most frequently used letter assigned to the one key of the at least one key is displayed in a first size, and a less frequently used letter assigned to the one key of the at least one key is displayed in a second size different from the first size.

7. The method of claim 6, wherein the first size is larger than the second size.

8. A numeric keypad, comprising:
a plurality of numerically labeled keys having at least one key of the plurality of numerically labeled keys mapped to alphabetic letters of a language,
wherein a plurality of the alphabetic letters are assigned to each of the at least one key,
wherein one key of the at least one key is configured to receive a first interaction and a second interaction,
wherein a first alphabetic letter is selected from among the plurality of alphabetic letters assigned to the one key of the at least one key, in response to the first interaction with the one key, such that the first alphabetic letter is a first most frequently used letter from among said plurality of letters assigned to the one key,
wherein a second alphabetic letter is selected from among the plurality of alphabetic letters assigned to the one key of the at least one key, in response to the second interaction with the one key, such that the second alphabetic letter is a second most frequently used letter from among said plurality of letters assigned to the one key in said language,
wherein the plurality of alphabetic letters assigned to the one key of the at least one key are displayed on a surface of the key in a stylized manner reflecting frequency of use of each of said plurality of alphabetic letters such that more frequently used letters are styled in a more ubiquitous manner in comparison to less frequently used letters, and
wherein a color coding scheme or a font visualization scheme is used to distinguish the more frequently used letters from the less frequently used letters.

9. The keypad of claim 8, wherein the plurality of alphabetic letters assigned to the one key of the at least one key are displayed on a surface of the one key in an order associated with frequency of use of each of said plurality of alphabetic letters.

10. The keypad of claim 9, wherein the plurality of alphabetic letters are displayed on the surface of the one key of the at least one key in a descending order with respect to highest frequency of use.

11. The keypad of claim 8, wherein a most frequently used letter assigned to the one key of the at least one key is displayed in a first color, and a less frequently used letter assigned to the one key of the at least one key is displayed in a second color different from the first color.

12. The keypad of claim 8, wherein a most frequently used letter assigned to the one key of the at least one key is displayed in a first font, and a less frequently used letter assigned to the one key of the at least one key is displayed in a second font different from the first font.

13. The keypad of claim 8, wherein a most frequently used letter assigned to the one key of the at least one key is displayed in a first size, and a less frequently used letter assigned to the one key of the at least one key is displayed in a second size different from the first size.

14. The keypad of claim 13, wherein the first size is larger than the second size.

* * * * *